United States Patent
Naghian et al.

(10) Patent No.: US 7,471,626 B2
(45) Date of Patent: Dec. 30, 2008

(54) TRAFFIC AND RADIO RESOURCE CONTROL IN A WIRELESS COMMUNICATION DEVICE

(75) Inventors: Siamak Naghian, Espoo (FI); Tero T. Kärkkäinen, Tampere (FI)

(73) Assignee: Nokia Corporation, Espoo (FI)

( * ) Notice: Subject to any disclaimer, the term of this patent is extended or adjusted under 35 U.S.C. 154(b) by 806 days.

(21) Appl. No.: 10/769,903

(22) Filed: Feb. 3, 2004

(65) Prior Publication Data

US 2005/0099943 A1    May 12, 2005

(30) Foreign Application Priority Data

Nov. 12, 2003    (FI) .................... 20031646

(51) Int. Cl.
*H04L 12/26* (2006.01)
(52) U.S. Cl. ...................... 370/229; 370/474
(58) Field of Classification Search ........... None
See application file for complete search history.

(56) References Cited

U.S. PATENT DOCUMENTS 5,812,554 A * 9/1998 Kadambi et al. .......... 370/473
2002/0080755 A1 6/2002 Tasman et al.
2003/0112766 A1 6/2003 Riedel et al.
2005/0260997 A1 * 11/2005 Korale et al. .......... 455/452.2
2005/0272438 A1 * 12/2005 Holur et al. .......... 455/452.2
2007/0097926 A1 * 5/2007 Liu et al. .................... 370/335

* cited by examiner

*Primary Examiner*—Firmin Backer
*Assistant Examiner*—Rhonda Murphy
(74) *Attorney, Agent, or Firm*—Squire, Sanders & Dempsey, LLP

(57) ABSTRACT

A traffic and radio resource control in a wireless device with multiple operation modes is disclosed. For accomplishing an efficient use of physical and radio resources in terms of the required service level, a first set of radio transmission resources is selected for an assembled output data stream. A path is then searched for with respect to each destination node of the stream, each path leading from the wireless communication device to the destination node in question and fulfilling the service level requirement corresponding to that destination node. The transmission of the output data stream is then scheduled according to the current state of the wireless communication device, when a path is found for each of the destination nodes. The operation modes of the wireless communication device are controlled to maintain the required service level during the transmission.

18 Claims, 4 Drawing Sheets

TRAFFIC AND RADIO RESOURCE CONTROL IN A WIRELESS COMMUNICATION DEVICE

BACKGROUND OF THE INVENTION

1. Field of the Invention

The invention relates to traffic control in a multimode wireless communication device (henceforth also a wireless device). The term "multimode" here refers to a wireless communication device having multiple modes of operation and being, respectively, capable of providing wireless connectivity according to multiple standards or de-facto solutions. The wireless communication device may be a fixed or a mobile network element, or a mobile device.

2. Description of the Related Art

The current development towards truly mobile computing and networking has brought on the evolvement of various access technologies that also provide the users with access to the Internet when they are outside their own home network. At present, wireless Internet access is typically based on either short-range wireless systems or mobile networks, or both.

Short-range wireless systems have a typical range of a few tens of meters to one hundred meters. They often combine with systems wired to the Internet to provide communication over long distances. The category of short-range wireless systems includes wireless personal area networks (PANs) and wireless local area networks (WLANs). They have the common feature of operating in unlicensed portions of the radio spectrum, usually either in the 2.4 GHz Industrial, Scientific, and Medical (ISM) band or in the 5 GHz unlicensed band.

Wireless personal area networks are cost-effective and use low power wireless devices that have a typical range of about ten meters. The best-known example of wireless personal area network technology is Bluetooth, which uses the 2.4 GHz ISM band. It provides a peak air link speed of one Mbps, and power consumption low enough for use in personal, portable electronics such as PDAs and mobile phones. Wireless local area networks generally operate at higher peak speeds of about 2 to 100 Mbps and have a longer range, which requires greater power consumption.

The development referred to above has also brought on the evolvement of so-called ad-hoc networks, which offer unrestricted mobility without any underlying infrastructure. The nodes of an ad-hoc network are often mobile, in which case the network is called a mobile ad-hoc network (MANET). Unlike traditional wireless networks, ad-hoc networks need not necessarily rest on an underlying infrastructure, such as base stations. Instead, all the nodes of an ad-hoc network share the responsibility of network formation and management. In an ad-hoc network, each node therefore acts as a router transmitting data/messages to other nodes of the network, and intermediate ad-hoc nodes relay the data/messages between two nodes located far apart from each. Standalone ad-hoc networks are useful at least whenever it is impossible to use a fixed network infrastructure due to geographical, terrestrial, or time constraints, for example. Local ad-hoc networks can also be integrated into legacy networks, such as mobile networks. The dynamically changing topology of an ad-hoc network sets high requirements for the routing protocols used in the ad-hoc nodes. This is one reason why activities in the development of the ad-hoc networks have for the present related mainly to routing aspects.

[Along with the above-discussed development, the number of radio technologies utilized in the terminals, and also the number of multi-mode (and multi-standard) wireless terminals will increase. With an increasing number of technologies used for networking, the diversity of the terminals will increase within future networks. For example, the trunk node of an ad-hoc network, which acts as an access point or gateway for other ad-hoc nodes in the ad-hoc network, communicates with an access point of a radio access network and with at least one other ad-hoc node being its subordinate node. The radio interface towards the radio access network is typically based on a different technology than the radio interface towards the ad-hoc network. Furthermore, the inter-node connections within the ad-hoc network may be based on different technologies.

One node may thus have to handle a plurality of data streams over the same or different radio interfaces, in addition to performing routing for the data streams. The node must therefore ensure, for example, that the end-to-end Quality of Service (QoS) requirements are fulfilled for the individual data streams, even though the QoS solutions and other capabilities of the different interfaces, and also the QoS requirements of the related data streams, would be quite different from each other.

In the above-referred communication environment the problem arises how to process and coordinate the different data streams to assure the end-to-end service provision for the different connections, while also maximizing the Quality of Service (QoS) requirements, optimizing the use of the physical resources of the node, and minimizing the interference and power consumption.

The invention seeks to provide a solution for the above-mentioned problem.

SUMMARY OF THE INVENTION

The invention seeks to improve the traffic and radio resource control in a multi-mode wireless communication device to achieve an efficient overall traffic transfer in the device. In other words, the invention seeks to enable a multi-mode wireless device to use its physical and radio resources as optimally as possible while also satisfying the QoS requirements of different end-to-end connections in an optimal manner.

In the present invention, data units (packets) of the data streams to be transmitted in a certain output direction are arranged into at least one output data stream based on the Quality of Service (QoS) parameters related to the data streams. This may involve adapting quality parameters that are differently defined for different types of connections to a common scale, so that the QoS required by each stream is determined with respect to a common "quality scale". A set of radio transmission resources is then selected for the arranged packets from the radio transmission resources currently available in the wireless device. This includes selection of the operation mode and may also include the selection of at least one link, if the selected operation mode includes several links. In response to the selection, a path is then searched for, which leads from the wireless device to the destination node of the packets and satisfies the QoS requirements of the packets. When evaluating the service levels of the different paths available from the wireless device to the destination node, it is assumed that the first leg of the paths is implemented by utilizing radio transmission resources belonging to the selected set of radio transmission resources. If a path satisfying the QoS requirements is found, the control process schedules the transmission of the at least one output data stream according to the current state of the wireless device. In addition to the control of the selected transmission resources, the control of the other radios of the device may also be necessary before the actual transmission, to ensure that the said other radios do not detract from the performance of the transmitting radio. The control may involve synchronization of the states of the different radios in order to maintain the required performance level for the transmitting radio.

Thus one embodiment of the invention is the provision of a traffic and radio resource control method for a wireless communication device with a plurality of operation modes. The method includes the steps of assembling data units of at least one incoming data stream into an output data stream, the data units being destined for at least one destination node and a service level requirement being attached to each of the at least one destination node and selecting a first set of radio transmission resources for the output data stream, where the first set of radio transmission resources belongs to radio transmission resources available in the wireless communication device. The method also includes a step of searching for a path that leads from the wireless communication device to one of the at least one destination node and fulfills the service level requirement corresponding to that destination node when one leg of the path is implemented by radio transmission resources belonging to the first set of radio transmission resources, where the searching step is performed with respect to each of the at least one destination node. The method further includes the steps of scheduling transmission of the output data stream when a path is found for each of the at least one destination node in the searching step, where the transmission is scheduled to occur through radio transmission resources belonging to the first set of radio transmission resources and controlling the operation modes of the wireless communication device so that (1) an operation mode corresponding to the first set of radio transmission resources is active when the transmission is scheduled to occur and that (2) the wireless communication device is with respect to its other operation modes in a state where the service level requirement of each destination node is maintained during the transmission.

In another embodiment, the invention provides a system for controlling traffic and radio resources in a wireless communication device with a plurality of operation modes. The system includes traffic assembly means for assembling incoming data unit streams into an output data stream, the data units being destined for at least one destination node and the output stream having a service level requirement for each of the at least one destination node and resource selection means for selecting a first set of radio transmission resources for the output data stream, where the first set of radio transmission resources belongs to radio transmission resources currently available in the wireless communication device. The system also includes routing means for searching for a path that leads to one of the at least one destination node and fulfills the service level requirement corresponding to that destination node when one leg of the path is implemented by radio transmission resources belonging to the first set of radio transmission resources, the routing means being configured to search for a path for each of the at least one destination node. The system further includes traffic scheduling means for scheduling transmission of the output data stream when a path is found for each of the at least one destination node, where the transmission is scheduled to occur through radio transmission resources belonging to the first set of radio transmission resources and control means for controlling the operation modes of the wireless communication device so that (1) an operation mode corresponding to the first set of radio transmission resources is active when the transmission is scheduled to occur and that (2) the wireless communication device is with respect to its other operation modes in a state where the service level requirement of each destination node is maintained during the transmission.

In a further embodiment, the invention provides a wireless communication device with a plurality of operation modes. The wireless communication device comprises a traffic assembly unit for assembling incoming data unit streams into at least one output data stream, the data units being destined for at least one destination node and the output data stream having a service level requirement for each of the at least one destination node and a resource selection unit for selecting a first set of radio transmission resources for the output data stream, where the first set of radio transmission resources belongs to radio transmission resources currently available in the wireless communication device. The wireless communication device also includes path detection means, for detecting whether a path leading to a destination node and fulfilling the corresponding service level requirement is available for each of the at least one destination node, where one leg of the path is implemented by radio transmission resources belonging to the first set of transmission resources. The wireless communication device further includes a traffic scheduling unit, responsive to the path detection means, for scheduling transmission of the output data stream, where the traffic scheduling unit is configured to schedule the transmission to occur through radio transmission resources belonging to the first set of radio transmission resources and control means for controlling the operation modes so that (1) an operation mode corresponding to the first set of radio transmission resources is active when the transmission is scheduled to occur and that (2) the wireless communication device is with respect to its other operation modes in a state where the service level requirement of each destination node is maintained during the transmission.

BRIEF DESCRIPTION OF THE DRAWINGS

In the following, the invention and its preferred embodiments are described more closely with reference to the examples shown in FIG. 1 to 6 in the appended drawings, wherein.

DETAILED DESCRIPTION OF THE PREFERRED EMBODIMENTS

As discussed above, the invention seeks to optimize the operation of a wireless multi-mode/multi-radio device. The wireless device may be an ad-hoc node or a mobile/portable/fixed device with wireless capabilities. It may also be a network element, such as a base station, a wireless router, an element capable of performing wireless routing and switching, a server, a relay node, or any combination of them in the access network. In a multi-radio wireless device, the different radios may be materialized by different hardware modules or by different software modules (software radio), or by a combination of hardware and software modules. Therefore, the environment in which the invention is applied may range from a stand-alone local ad-hoc network to a more heterogeneous environment, such as the one shown in FIG. 1.

Figure 1:
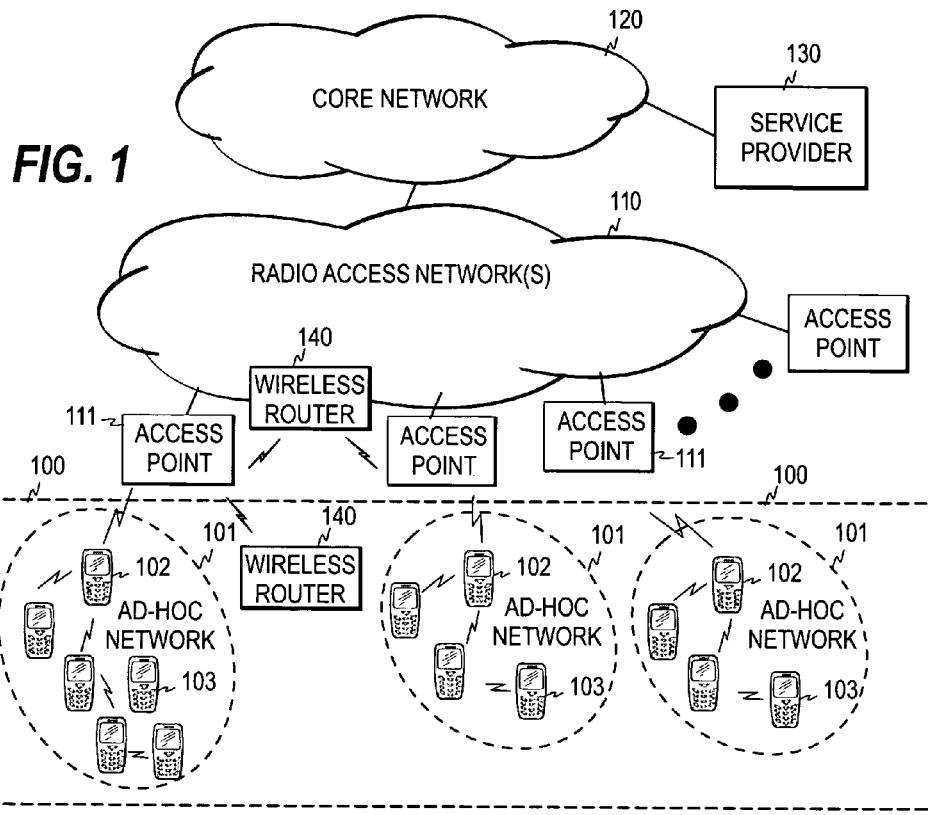
FIG. 1 illustrates an example of a general communication environment in which the principles of the present invention may be beneficially implemented.

FIG. 1 illustrates an example of a communication environment in which the present invention can be applied. The system includes three interacting domains: an ad-hoc domain 100 comprising one or more ad-hoc networks 101, an access domain 110 comprising one or more radio access networks, and a backbone domain 120 comprising a core network. The access domain includes one or more access points 111, such as base stations, access routers, or WLAN access points, through which the ad-hoc networks may be connected to the radio access network. As discussed below, the network elements of the access domain may also be capable of forming ad-hoc networks.

Each ad-hoc network comprises at least one trunk node 102, which communicates with an access point of the radio access network, and at least one other ad-hoc node 103 for which the trunk node acts as an access point or gateway. The said other nodes may be located at different distances from the trunk node, measured as the number of hops between the node and the trunk node, i.e. the trunk node does not have to have a direct connection to each of said other nodes, but the messages between the trunk node and an ad-hoc node being further than one hop apart from the trunk node are relayed by intermediate ad-hoc nodes. Therefore, inside a sub-network served by a trunk node, a connection may involve the end nodes and one or more intermediate nodes. The ad-hoc nodes may also form different sub-networks. The trunk node may also serve more than one ad-hoc network, and with different radio interfaces. In addition to mobile terminals, an ad-hoc network may also include wireless routers 140, which may also assume the responsibilities of a trunk node. The ad-hoc nodes, the wireless routers, and the access points are typically the network elements into which the control process of the invention may be introduced. The wireless routers may also be located in the access domain, in which case the ad-hoc networks may penetrate into the access domain.

Each local ad-hoc network may thus be connected to an overlaying network infrastructure comprising at least one radio access network and a core network. The radio access network and/or the core network may further be connected to one or more external networks, such as the Internet. The core network and/or the external network typically include service providers 130.

Figure 2:
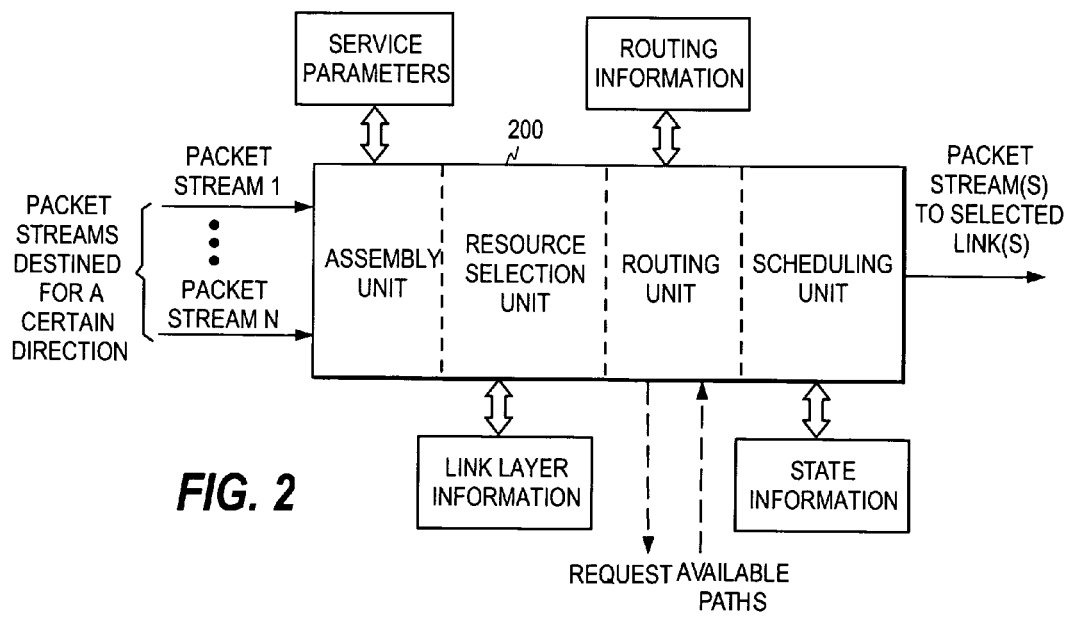
FIG. 2 is a simplified block diagram illustrating the packet scheduling according to the invention.

FIG. 2 is a schematic presentation of one embodiment of a traffic and radio resource control process 200 according to the invention. A plurality of packet streams destined for a certain direction, i.e. packet streams for which a common radio link may be found, are input to the control process. In the process, the packets are first assembled into an output packet stream based on the service parameters of the individual streams. It is assumed here that the output packet stream is destined for one destination node (which may be the destination node of the individual packet streams). The service parameters determine a certain service level for the output stream. After this, a set of radio transmission resources is selected for the rearranged packets based on the current state of the radio transmission resources available in the wireless device (link layer information) and based on the service level. This selection thus involves the selection of the operation mode, and possibly also the selection of a radio link, if the selected operation mode includes several links. The selection of the radio link involves the selection of associated link parameters, such as power parameters.

Based on routing information, paths are then searched for, which lead from the wireless device to the destination node of the output packet stream and which satisfy the quality requirements of the packets. When considering the QoS of a path, it is assumed that the first leg of the path is implemented by utilizing the selected set of radio transmission resources or its subset.

If an acceptable path is found, the current state of the wireless device is checked and the transmission of the packets is scheduled according to that state. If necessary, the state of the wireless device is changed prior to the transmission and the other operation modes of the device are controlled so that they do not detract from the performance of the transmitting device. The scheduling process may also use other input information, such state control information received from the network. If an acceptable path is not found directly, the control process tests whether the service level is to be compromised or whether it can still be met by reconfiguring the set of radio transmission resources, for example. This is discussed in more detail below. As shown in the figure, each of the above phases may also be performed in a separate unit communicating with one or more of the other units. As discussed below, the paths available from the wireless device to the destination node may also be obtained from an outside routing algorithm.

If there are several destination nodes attached to the output packet stream (i.e. if the individual streams have different destinations), an acceptable path is searched for each destination node. The QoS requirement (i.e. the service level) related to each path is determined by the fact that the traffic on each leg of the path must experience a service level required by that traffic.

Figure 3:
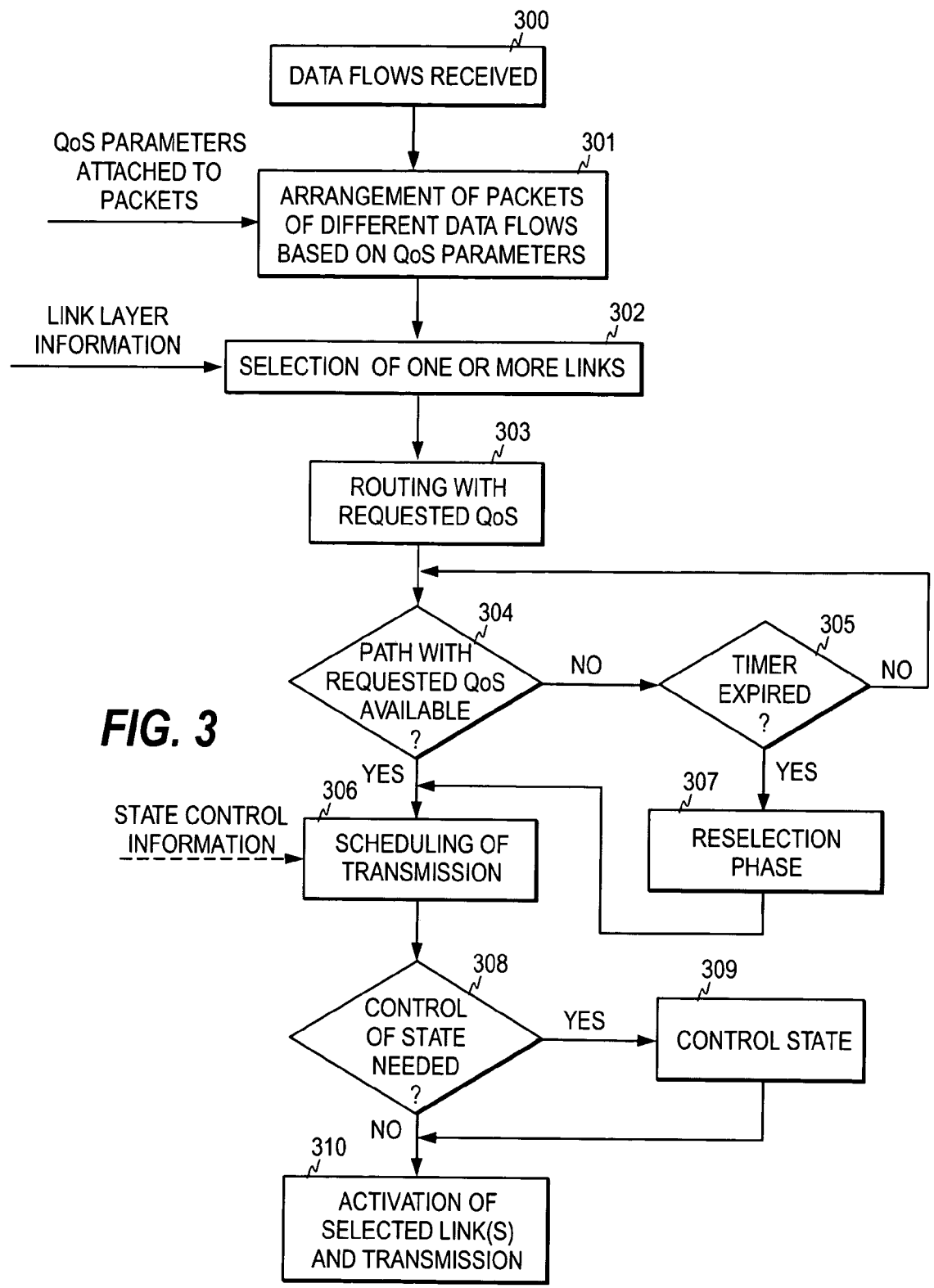
FIG. 3 is a flow chart illustrating the traffic and radio resource control of the invention.

FIG. 3 is a flow chart illustrating the traffic and radio resource control process according to one embodiment of the invention. The process may receive a plurality of packet streams, which may come from different radio interfaces of the wireless device, either simultaneously or during different reception periods (step 300). As mentioned above, the packet streams received at step 300 are such that a common radio link can be chosen for them, i.e. the packet streams may all be transmitted in the same direction from the wireless device. However, the packet streams may be destined for one or more destination nodes. The process may also receive only one packet stream, which is routed to several output interfaces. For example, the same data may be downloaded from the core network to a plurality of ad-hoc networks through a gateway node. It is first assumed that the packet streams are destined for one destination node.

In case the wireless device receives more packet streams than the ones that are to be aggregated, the wireless device may determine the packet streams to be aggregated based on the routing information of the packets/streams and/or based on input interfaces of the streams, for example. For different kinds of connections/radio technologies, the QoS parameters may be defined differently. This means that the wireless device may be able to convert the differently defined QoS parameters to a common scale in order to be able to compare the differently defined parameters with each other. Based on the parameters and their comparison, the wireless device then assembles the packets of the received streams into an output packet stream while maintaining service fairness between the different streams (step 301). A service level requirement is defined for the output packet stream based on the QoS parameters of the individual streams.

Once the incoming streams have been aggregated, the control process searches for at least one radio link for transferring the output packet stream (step 302). The wireless device thus selects optimal radio link(s) from among the links available for the direction to which the output packet stream is destined for. The selection may be based on various criteria, such as the throughput capability of the links, power consumption, interference caused by the radios, capacity of the links, load factors, etc. This information is typically obtained from the link layer, but the selection criteria may also include predefined system parameters. The selection of the link(s) includes the selection of the operation mode (i.e. the connectivity technology to be used). However, the selected operation mode, such as Bluetooth or WLAN, may include several links, in which case the link(s) is/are to be selected, in addition to the selection of the operation mode.

When selecting the link(s) for the rearranged packets, the control process may decide to change various parameters in order to make a certain operation mode the best available choice for the output packet stream. The control process may, for example, reallocate the resources of various links. This may involve allocating more resources (time slots, codes, etc.) to one or more links that are heavily loaded. The control process may also carry out advanced operations that make a certain radio technology more suitable for the packet stream. For example, the control process may change various transmission parameters used, such as the modulation rate, the coding, or the transmission power or various reception parameters used, such as reception thresholds. The control process may also decide to adopt other techniques, such as beam forming, to reduce the Multiple Access Interference (MAI) and background noise. The control process may also decide to divide the traffic between different radios or different links, depending on the capacities and capabilities of the radios/links. For example, the control process may select one radio for user data and another radio for control data.

When at least one possible radio link has been found for the output packet stream, the control process evokes a routing algorithm to find out the paths from the wireless device to the destination node, which satisfy the QoS requirements of the individual streams (step 303). The control process further sets a timer that defines the maximum waiting time for the results. If at least one acceptable path is found from the wireless device to the destination node before the timer expires (step 304/yes), the wireless device knows that it can transmit the packet stream with the service level required. If only one radio link was selected at step 302, the wireless device schedules the transmission of the packets (step 306). This involves checking the current state of the wireless device to define when the wireless device can be in a state where the transmission may be performed. This may also involve checking incoming state control information, if the state of the wireless device may be controlled from the outside of the wireless device, such as from the network. The wireless device then activates the selected link and transmits (step 310) the packets over the selected link according to the scheduled transmission time. Before this, the state of the wireless device is controlled, if necessary (steps 308 and 309). The control of the state may involve control of one or more of the other radios operating in the wireless device, in addition to the device being controlled in an active state with respect to the operation mode corresponding to the selected link. The control of the other radios may be necessary to ensure that they do not detract from the performance of the device when transmitting over the selected link, i.e. that the QoS requirement(s) is/are maintained on the selected link during transmission. The control of the state may also involve mutual synchronization of the states of the different operation modes in order to make sure that the required service level is maintained during transmission.

If more than one radio link was selected at step 302, the scheduling of the transmission may further include a final decision on the link(s) to be used for transmission. This decision may be made based on the paths found, i.e. the path information obtained from step 303 may be used to finally select one or more radio links for the transmission. As each of the selected links may form the first leg of the path found, the control process may select the link(s) that are the most favorable in terms of the path. The control process may also select to use more than one link, in which case the data stream is divided between the links.

If no acceptable paths are found before the timer expires (step 305/yes), the control process proceeds to a reselection phase 307, in which the control process tests whether the QoS requirements are to be compromised or whether the required service level may still be achieved by reselecting the radio transmission resources or by reconfiguring the selected radio transmission resources. This may be implemented in different ways depending on the outcome of the routing step 303. First, if the routing step yielded paths for which the QoS value is closer than a predetermined value to the original QoS requirement, the path may be selected from among said paths. For example, the path that offers the highest service level may be examined. In this connection, the control process may change the transmission power or other parameters of the link(s) selected at step 302 to see which combination provides the best QoS value for the said path. Second, the control process may return to step 302 and repeat the link selection, possibly with a new QoS requirement. Here too, the control process may change the transmission power or other parameters of the link(s). The paths available are then examined to find out whether a path is found that provides an acceptable level of service.

When a path has been found that provides a service level that reaches the required service level or is close enough to it when the first leg of the path is implemented by the selected resources, the control process jumps to step 306 and proceeds as discussed above.

If the different streams in the output packet stream have more than one destination address (destination node), an acceptable path is searched for with respect to each destination node. If an acceptable path is not found for one or more destination nodes, the control process enters the reselection phase, in which it may try to reconfigure the selected radio transmission resources and repeat the process for each destination node to see if an acceptable path may be found for the destination nodes after the reconfiguration. The reselection may be limited to the unsuccessful cases or it may contain the reselection of the entire path set. The control process may also return to step 301 in order to reassemble the output stream so that the packets are favored for which an acceptable path was not found. After this, the service levels of the paths available may be evaluated again. Before the evaluation, the radio transmission resources may be reconfigured or new radio transmission resources may be selected.

The selection of the link(s) is thus performed before the actual routing so that optimal physical resources may first be selected for the data to be transferred. However, the selection of the physical resources and the routing are performed tightly together so that the physical resources allocated for the data to be transmitted may still be affected depending on the possible routing alternatives and the corresponding service levels. In this way, an optimal combination of physical and radio resources, as well as quality of service, may be found for the data to be transferred.

Figure 4:
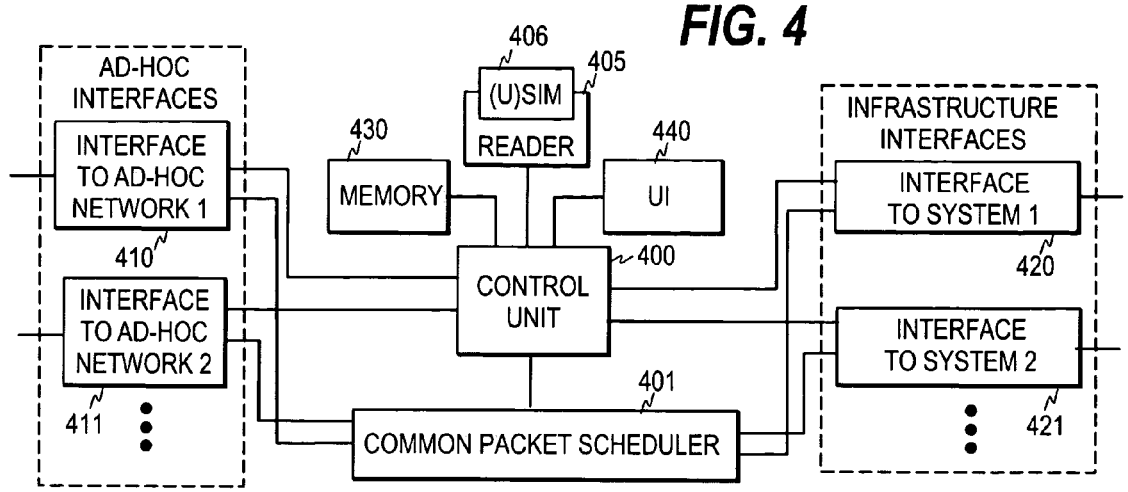
FIG. 4 is a general representation of a wireless device provided with the functionality of the invention.

FIG. 4 is a schematic presentation of the general structure of a wireless device according to the invention. The core of the wireless device is formed by a control unit 400 and a common packet scheduler 401, which perform the above-described operation and which are connected to various interfaces of the wireless device. However, as discussed below, the routing step may be performed entirely or partly outside the wireless device. In the latter case, the paths may be searched for outside the wireless device, but the related QoS evaluation may be performed in the wireless device, for example.

It is also to be noted that in case of proximity single-hop ad-hoc networks, such as PAN networks with peer-to-peer connections, the multihop routing discovery need not necessarily be executed, but rather the connection establishment may follow the principles of peer-to-peer communications. In case of a single-hop network, the search for a path that fulfills the service level requirement is thus less complicated.

The interfaces of the wireless device may be divided into two classes: interfaces for ad-hoc networks and interfaces for the network infrastructure. The ad-hoc interfaces include one or more interfaces 410, 411, each offering the functionality needed to accomplish wireless connectivity in a certain operation mode. For example, one interface may be based on WLAN technology, while another one may be based on Bluetooth technology, RFID technology, or on the HomeRF specifications. The interfaces to the supporting infrastructure also include one or more interfaces 420, 421, each offering the functionality needed to accomplish connectivity to a system (i.e. network infrastructure) of a particular type. For example, interface 411 may offer connectivity to a GSM or UMTS network, while interface 412 offers connectivity to a WLAN network. The actual interfaces contained in the wireless device depend on the type and operation of the wireless device. Furthermore, although the interfaces are here shown as separate units, they may also be partly combined if two operation modes utilize similar technologies. For example, if two operation modes (i.e. technologies) utilize frequency hopping, the RF front end may be shared by the corresponding interfaces.

The wireless device further includes a memory unit 430 and, especially in the case of a mobile station, it may also include a card reader 405 into which an identity module, such as a (Universal Subscriber Module ((U)SIM), User Identity Module (UIM) or a (User) Integrated Circuit Card ((U)ICC) 406 can be inserted. The memory unit and the possible card reader are connected to the control unit in order that the control unit is able to read data from the memory unit and the identity module and write data into the memory unit and into the identity module. In addition, the wireless device typically includes user interface means 440 for using the wireless device. In the case of a mobile station, the user interface means typically include a display and a keypad. The structure of the wireless device may also be modular so that it comprises a standalone ad-hoc module separate from a module containing the infrastructure interface.

In a network environment shown in FIG. 1, the ad-hoc routing functionality may be introduced into the access points, enabling the access points to provide ad-hoc routing in a mobile ad-hoc mesh network in parallel with their normal functionalities. When in ad-hoc mode, an access point may thus be able to route the packets from an ad-hoc source node to the ad-hoc destination node(s) within a local or/and wide area ad-hoc network. At the same time, the access point may handle the traffic and control data destined to its own coverage area. A multi-radio node may also operate entirely as an ad-hoc node, handling the ad-hoc traffic over the local ad-hoc network or tying the local network to the overlaying network.

Figure 5:
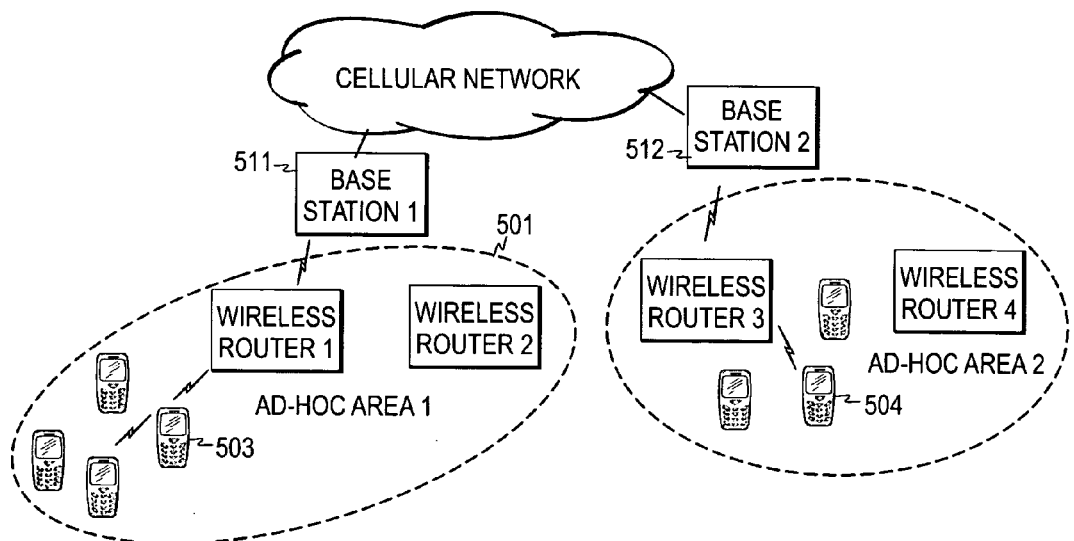
FIG. 5 illustrates an embodiment in which a base station of a mobile communication network is utilized in the process of the invention.

FIG. 5 illustrates a communication environment where the ad-hoc routing functionality is introduced into the base stations of a mobile communication network 520. The communication environment comprises two different ad-hoc networks connected to the mobile communication network, i.e. to a cellular network, through base stations 511 and 512 operating both as base stations in the mobile communication network and as wireless routers in the corresponding ad-hoc area. Due to their dual functionality, the base stations are here termed the base routing stations. It is assumed here that an ad-hoc node 503 within the ad-hoc network 501 wants to set-up a connection with another ad-hoc node 504 located in a remote ad-hoc area. In this example, the source node 503 then performs the steps discussed in connection with FIG. 3, except that it may now evoke the routing algorithm from base station 511 at step 303, in which case the base station may provide a list of alternative paths to the source node.

In this kind of network-assisted routing the base station may route the traffic through the mobile communication network to a base station 512 serving the local ad-hoc area of the destination node. The base station 512 may then route the traffic via one or more ad-hoc nodes or wireless routers to the destination node. The established route may not be optimized in terms of the number of hops or power consumption, but these drawbacks are compensated by the fact that the base stations have an unlimited power supply, contrary to the mobile ad-hoc nodes. In addition, utilizing the base routing stations brings about the possibility of establishing a hierarchical ad-hoc network without introducing severe energy and processing limitations into the nodes. A base routing station may also be a preferred node when allocating or electing the trunk node (gateway node) functionality in a hierarchical network.

Figure 6:
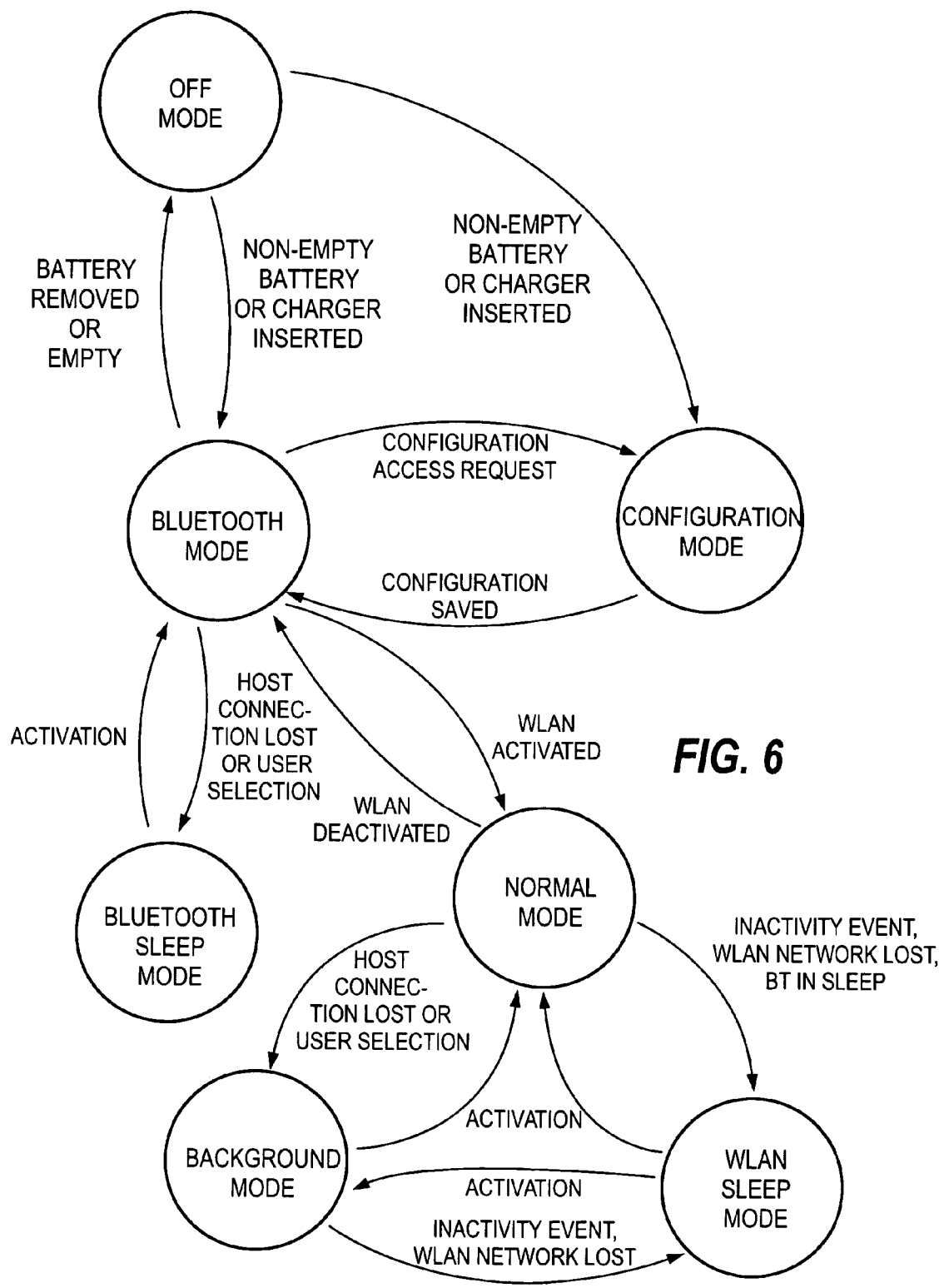
FIG. 6 is a state diagram illustrating the different states of a wireless device in one embodiment of the invention.

FIG. 6 is state diagram illustrating the states of the wireless device in one embodiment of the invention assuming that the element is a mobile station with WLAN and Bluetooth operation modes. The terminal may comprise seven main states or modes that are shown as circles in the figure. These are the OFF state, the Bluetooth state, the configuration state, the normal state, the background state, the Bluetooth sleep state, and the WLAN sleep state. If the battery of the terminal is removed or is empty, the terminal is in the OFF state. When the battery is connected or a charger is inserted, the terminal boots up and enters the Bluetooth state, if the terminal has a mobile phone associated with it. In this state the terminal may be controlled via the mobile phone. However, the configuration state is entered from the OFF state, if the terminal does not have a mobile phone associated with it. Otherwise the configuration state may be entered only from the Bluetooth state in response to a configuration request given from the mobile phone. In the normal state both radios may be active. From the normal state the terminal may enter the background state, if the connection to the host (i.e. to the controlling entity) is lost. The WLAN and local network services are left active in the background state. In the Bluetooth sleep mode, the Bluetooth radio is closed between network scans. If the host is found, the terminal returns to the previous state. WLAN may be active at the same time. In WLAN sleep mode, the WLAN radio is closed between network scans. If a network is found, the terminal returns to the previous mode. Bluetooth may be active at the same time.

A Bluetooth link may thus be activated directly, if the terminal is in the normal or Bluetooth state, while a WLAN link may be activated directly, if the terminal is in the normal or WLAN state. If the terminal is in a sleep state or in the background state where the transmission of the packets is not possible, the state of the terminal is changed before the scheduled transmission is due.

In all cases, the state transition may be evoked and executed by link management (link layer operation) in the multimode element/device, by independent or network-assisted signaling means, or by any of their combinations.

Although the invention was described above with reference to the examples shown in the appended drawings, it is obvious that the invention is not limited to these, but may be modified by those skilled in the art without departing from the scope and spirit of the invention. For example, the technologies on which the ad-hoc networks and the overlaying networks are based may vary according to current and future connectivity standards.

The invention claimed is:

1. A method, comprising:
    assembling data units of at least one incoming data stream into an output data stream, wherein the data units are destined for at least one destination node, and the output stream comprises a service level requirement for each of the at least one destination node;
    selecting, in response to the assembling, a first set of physical radio transmission resources for the output data stream, wherein the first set of physical radio transmission resources is selected from physical radio transmission resources of one of a plurality of wireless connectivity technologies and belongs to physical radio transmission resources available in a wireless communication device, wherein the wireless communication device is provided with the plurality of wireless connectivity technologies;
    searching for a path that leads from the wireless communication device to one of the at least one destination node and fulfills the service level requirement corresponding to that destination node when one leg of the path is implemented by the first set of physical radio transmission resources, wherein the searching is performed with respect to each of the at least one destination node;
    scheduling a transmission of the output data stream when the path is found for each of the at least one destination node, wherein the scheduling presumes that the transmission is to occur through the first set of physical radio transmission resources; and
    controlling the plurality of connectivity technologies of the wireless communication device so that a connectivity technology corresponding to the first set of physical radio transmission resources is in an active state when the transmission is scheduled to occur and the wireless communication device is with respect to its other wireless connectivity technologies in a state where the service level requirement of each destination node is maintained during the transmission.

2. A method according to claim 1, further comprising:
    determining a path comprising a highest service level of all paths leading to a destination node, wherein the determining is performed for a destination node to which no path fulfilling the corresponding service level requirement is found.

3. A method according to claim 2, further comprising:
    configuring the first set of physical radio transmission resources;
    testing whether the determined path comprising the highest service level fulfills the service level requirement for the at least one destination node in response to the configuring; and
    scheduling a transmission of the output data stream when the determined path fulfills the service level requirement for the at least one destination node, wherein the scheduling presumes that the transmission is to occur through the first set of physical radio transmission resources,
    wherein the configuring is performed when no path fulfilling the respective service level requirement is found for the at least one destination node in the searching.

4. A method according to claim 1, wherein the searching comprises finding all paths leading from the wireless communication device to the at least one destination node.

5. A method according to claim 4, wherein the searching further comprises performing the finding in another network element.

6. A method according to claim 1, wherein the controlling comprises changing, prior to the transmission of the output data stream, the wireless connectivity technology that is in an active state.

7. A method according to claim 1, wherein the selecting comprises utilizing information about a current state of the physical radio transmission resources available in the wireless communication device.

8. A method according to claim 1, wherein the other wireless connectivity technologies comprise a plurality of operation states, and the controlling comprises synchronizing the plurality of operation states for maintaining the service level requirement of each destination node during the transmission.

9. A method, comprising:
    assembling data units of at least one incoming data stream into an output data stream, wherein the data units are destined for at least one destination node, and the output stream comprises a service level requirement for each of the at least one destination node;
    selecting, in response to the assembling, a first set of physical radio transmission resources for the output data stream, wherein the first set of physical radio transmission resources is selected from physical radio transmission resources of one of a plurality of wireless connectivity technologies and belongs to physical radio transmission resources available in a wireless communication device, wherein the wireless communication device is provided with the plurality of wireless connectivity technologies;
    searching for a path that leads from the wireless communication device to one of the at least one destination node and fulfills the service level requirement corresponding to that destination node when one leg of the path is implemented by the first set of physical radio transmission resources, wherein the searching is performed with respect to each of the at least one destination node;
    scheduling a transmission of the output data stream when the path is found for each of the at least one destination node, wherein the scheduling presumes that the transmission is to occur through the first set of physical radio transmission resources;
    choosing a second set of radio transmission resources for the output data stream;
    re-searching, in response to the choosing, for a path that leads from the wireless communication device to one of the at least one destination node and fulfills the service level requirement corresponding to that destination node when one leg of the path is implemented by the second set of physical radio transmission resources, wherein the searching is performed with respect to each of the at least one destination node; and scheduling a transmission of the output data stream when the path is found for each of the at least one destination node in the re-searching, wherein the scheduling presumes that the transmission is to occur through the second set of physical radio transmission resources.

10. A method according to claim 9, further comprising:
configuring the physical radio transmission resources available in the wireless communication device.

11. A method according to claim 9, further comprising:
rearranging the data units in the output data stream.

12. A system, comprising:
traffic assembler configured to assemble data units for at least one incoming data stream into an output data stream, wherein the data units are destined for at least one destination node, and the output stream comprises a service level requirement for each of the at least one destination node;

resource selector, responsive to the traffic assembler, configured to select a first set of physical radio transmission resources for the output data stream, wherein the first set of physical radio transmission resources is selected from physical radio transmission resources of one of a plurality of wireless connectivity technologies and belongs to physical radio transmission resources currently available in a wireless communication device, the wireless communication device being provided with the plurality of wireless connectivity technologies;

router configured to search for a path that leads to one of the at least one destination node and fulfills the service level requirement corresponding to that destination node when one leg of the path is implemented by the first set of physical radio transmission resources, wherein the router is further configured to search for the path for each of the at least one destination node;

traffic scheduler configured to schedule a transmission of the output data stream when the path is found for each of the at least one destination node, wherein the transmission is scheduled to occur through the first set of physical radio transmission resources; and a controller configured to control the plurality of wireless connectivity technologies of the wireless communication device so that a wireless connectivity technology corresponding to the first set of physical radio transmission resources is in an active state when the transmission is scheduled to occur and that the wireless communication device is with respect to its other wireless connectivity technologies in a state where the service level requirement of each destination node is maintained during the transmission.

13. A system according to claim 12, wherein the traffic assembler, the resource selector, the traffic scheduler, and the controller reside in a single wireless communication device.

14. A system according to claim 12, wherein the other wireless connectivity technologies comprise a plurality of operation states; and the controller is further for synchronizing the plurality of operation states to maintain the service level requirement of each destination node during the transmission.

15. An apparatus, comprising:
a traffic assembler configured to assemble data units of at least one incoming data stream into an output data stream, wherein the data units are destined for at least one destination node, and the output data stream comprises a service level requirement for each of the at least one destination node;

a resource selector responsive to the traffic assembler and configured to select a first set of physical radio transmission resources for the output data stream, wherein the first set of physical radio transmission resources is selected from physical radio transmission resources of one of a plurality of wireless connectivity technologies and belongs to physical radio transmission resources currently available in the apparatus;

a path detector configured to detect whether a path leading to a destination node and fulfilling the corresponding service level requirement is available for each of the at least one destination node, wherein one leg of the path is implemented by the first set of transmission resources and wherein the path detector is operably connected to a routing entity configured to search for paths leading from the apparatus to the at least one destination node;

a traffic scheduler, responsive to the path detector configured to schedule a transmission of the output data stream, wherein the traffic scheduler is configured to schedule the transmission to occur through the first set of physical radio transmission resources; and a controller configured to control the plurality of wireless connectivity technologies so that a wireless connectivity technology corresponding to the first set of physical radio transmission resources is in an active state when the transmission is scheduled to occur and that the apparatus is with respect to its other wireless connectivity technologies in a state where the service level requirement of each destination node is maintained during the transmission.

16. An apparatus according to claim 15, wherein the path detector comprises an interface for the routing entity, wherein the routing entity resides outside the apparatus and the interface is configured to receive the information about paths leading from the apparatus to the at least one destination node.

17. An apparatus according to claim 15, wherein the apparatus comprises the routing entity, the routing entity being configured to search all paths leading from the apparatus to the destination node.

18. The apparatus according to claim 15, wherein the other wireless connectivity technologies comprise a plurality of operation states; and the controller is further configured to synchronize the plurality of operation states to maintain the service level requirement of each destination node during the transmission.

* * * * *